United States Patent [19]

Mori et al.

[11] Patent Number: 4,510,498

[45] Date of Patent: Apr. 9, 1985

[54] PLATE ANTENNA FOR DIRECTION FINDER

[75] Inventors: Kenzo Mori; Hyo Yasuda, both of Tokyo; Minoru Suzuki, Yamato, all of Japan

[73] Assignee: Taiyo Musen Co. Ltd., Tokyo, Japan

[21] Appl. No.: 475,358

[22] Filed: Mar. 14, 1983

[30] Foreign Application Priority Data

Dec. 14, 1982 [JP] Japan ............................... 57-217886

[51] Int. Cl.³ ............................................... G01S 5/04

[52] U.S. Cl. ............................ 343/435; 343/700 MS; 343/846

[58] Field of Search ................ 343/700 MS, 846, 852, 343/374, 435

[56] References Cited

U.S. PATENT DOCUMENTS 3,478,362 11/1969 Ricardi et al. .............. 343/700 MS

*Primary Examiner*—Eli Lieberman

*Attorney, Agent, or Firm*—A. W. Breiner

[57] ABSTRACT

In an antenna device for a direction finder including an electrically conductive antenna plate of a configuration symmetrical around its center and disposed in parallel with a base plate with a predetermined distance maintained therebetween, a plurality of pairs of connecting portions are provided around the antenna plate so that one in each pair is provided opposite to the other with respect to the center. An electronic switch provided in the device transfers the connection in order that one in a pair thus transferred is grounded through a resistor having the characteristic impedance of the antenna plate while the other in the pair is connected to the receiver of the direction finder through a cable having the characteristic impedance.

3 Claims, 9 Drawing Figures

PLATE ANTENNA FOR DIRECTION FINDER

FIELD OF INVENTION AND BACKGROUND

The present invention relates to an antenna device for a direction finder, and more particularly to a type of antenna device having an antenna which is held stationary.

An antenna for a direction finder which includes an electrically conductive plate in a square configuration, for example disposed in parallel with an electrically conductive base plate of a sufficient size with there being a predetermined space maintained between the two plates, is known. In the known antenna one corner of the antenna plate is connected to the base plate through a resistor having a resistance equal to the characteristic impedance of the antenna, while a diagonally opposite corner of the antenna plate is connected to a receiver of the direction finder through a cable having the characteristic impedance. Since the antenna as above described provides an output characteristic in the form of a cardioid against an electromagnetic wave arriving in parallel with the antenna plate, it can be used in combination with a direction finding unit to determine the arriving direction of the electromagnetic wave. However, the known construction of such antenna devices has included a rotating mechanism for rotating the antenna in determining the arriving direction, or in following automatically the variation of the arriving direction of the electromagnetic wave. Accordingly, the device has been complicated, causing various disadvantages including susceptibility to troubles and poor precision.

SUMMARY OF THE INVENTION

A primary object of the present invention is to provide an antenna device for a direction finder wherein the above-described difficulties of the conventional antenna device are substantially eliminated.

Another object of the invention is to provide an antenna device for a direction finder wherein the complicated rotating mechanism for the antenna is completely eliminated.

Still another object of the invention is to provide an antenna device for a direction finder wherein the accuracy of the measured results are substantially improved.

According to the present invention, there is provided an antenna device for a direction finder comprising an electrically conductive base plate connected to the earth or grounded; an electrically conductive plate of a configuration symmetrical with respect to a central point thereof which is disposed in parallel with the base plate with a predetermined space maintained between the two plates; a plurality of pairs of connecting portions provided around the periphery of the electrically conductive plate so that one portion in each pair of the connecting portions is provided at a position opposite to the other portion in the pair with respect to the central point of the electrically conductive plate, and an electronic switch sequentially transferring the connection with the connecting portions such that one in each pair of the connecting portions thus transferred is grounded through a resistor having a resistance substantially equal to a characteristic impedance of the electrically conductive plate while the other in the pair is connected to a receiver through a cable having an impedance substantially equal to the characteristic impedance.

The invention will be described in detail with reference to the accompanying drawings.

BRIEF DESCRIPTION OF THE DRAWINGS

In the accompanying drawings.

DESCRIPTION OF THE PREFERRED EMBODIMENTS

Figure 1:
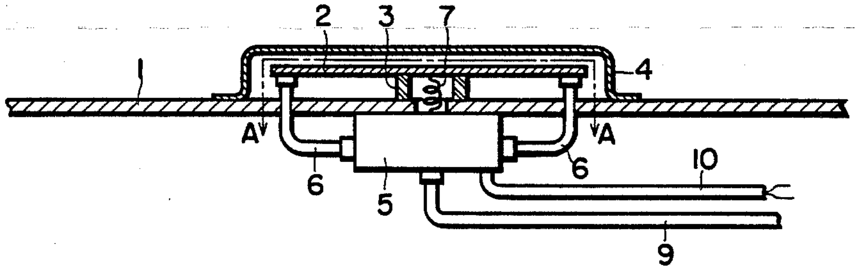
FIG. 1 is a cross-sectional view of one preferred embodiment of the present invention.

Referring now to FIG. 1 showing a first preferred embodiment of the present invention, there is provided an electrically conductive base plate which is, for example, a shell plate of an airplane. Upwardly above the electrically conductive base plate 1, an electrically conductive plate 2 is disposed in parallel with the base plate 1 with a predetermined space maintained therebetween. The plate 2 is held at this position by insulating braces 3 and covered by an insulating outside cover 4. The plate 2 operable as an antenna as described hereinafter may be formed into, for example, a square, and the four corners of the square plate are connected to corresponding elements in casing 5 through four coaxial cables 6 of equal lengths. For example, a central part of the electrically conductive plate 2 operable as an antenna is connected to a terminal in casing 5 through a coil 7. With the above-described construction, the antenna plate 2 can be easily installed on the body of, for example, an airplane by simply providing small holes through the body for installing cables therethrough.

Figure 2:
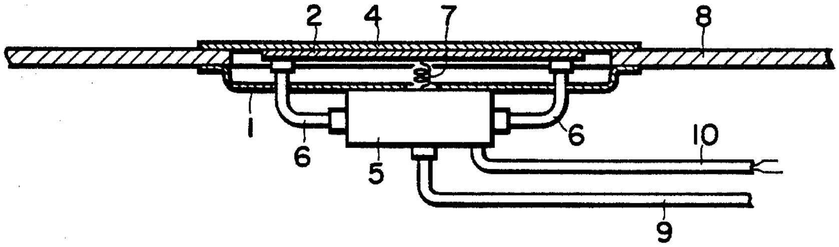
FIG. 2 is a cross-sectional view of another preferred embodiment of the invention.

FIG. 2 illustrates another preferred embodiment of an installation wherein a part of a roof 8 of an automobile is cut-away to provide an opening larger than the antenna plate 2. An insulating cover 4 is attached from outside of the roof 8 for closing the opening entirely. Antenna plate 2 is secured to the interior of the insulating cover 4. A separate electrically conductive base plate 1 is secured to the internal surface of the roof 8 to cover the opening entirely from inside and to maintain a predetermined space between the base plate 1 and the antenna plate 2. A casing 5, similar to that shown in FIG. 1, is secured to the internal surface of the base plate 1. In this manner, the antenna of a direction finder can be installed on the roof of an automobile so as not to be easily noticeable from outside the automobile. The casing 5 includes an electronic switch, the essential parts of which are connected through a coaxial cable 9 and a control cable 10 to the receiver of the direction finder.

Figure 3:
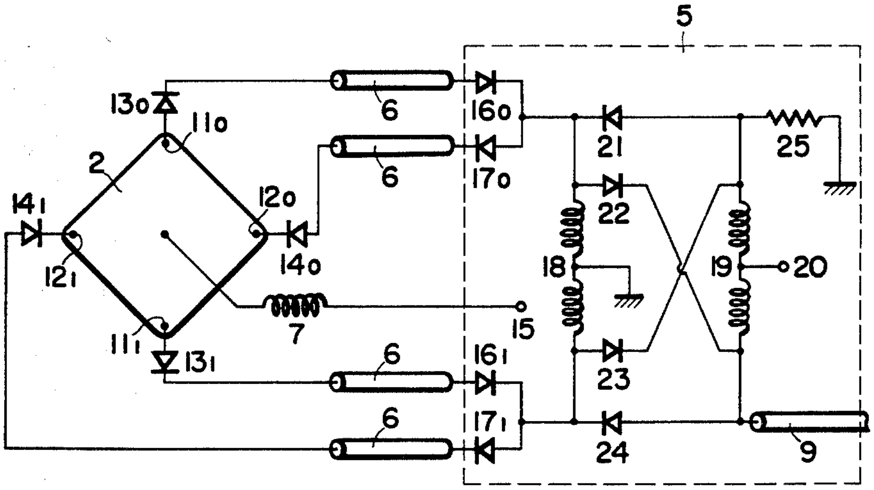
FIG. 3 is a circuit diagram applicable to either one of the embodiments of FIGS. 1 or 2.

FIG. 3 illustrates a circuit diagram of the antenna device according to the present invention wherein the plan view taken alone the line A—A of FIG. 1 is shown as one part of the diagram. In FIG. 3 the antenna plate 2 is square having four corners, among which two diagonally opposite corners are provided with connecting portions $11_0$ and $11_1$, while the other two diagonally opposite corners are provided with connecting portions $12_0$ and $12_1$, respectively. The connecting portions $11_0$, $11_1$, $12_0$, and $12_1$ are connected through diodes $13_0$, $13_1$, $14_0$, and $14_1$ to the four coaxial cables 6, respectively.

The space between the base plate 1 and the antenna plate 2 (FIGS. 1 and 2) is so selected that the antenna plate 2 exhibits a characteristic impedance for an electromagnetic wave arriving in the diagonal direction of the antenna plate 2 which is equal to the characteristic impedance of the coaxial cables 6. Furthermore, a suitable position of the antenna plate 2, such as the center of plate 2, is connected through a high-frequency blocking coil 7 to a terminal 15 in casing 5. In casing 5 the ends of the coaxial cables 6 connected at the other ends thereof with the diodes $13_0$ and $14_0$ are short-circuited through diodes $16_0$ and $17_0$ having equal polarities with those of diodes $13_0$ and $14_0$, while the ends of the coaxial cables 6 connected at the other ends thereof with the diodes $13_1$ and $14_1$ are short-circuited through diodes $16_1$ and $17_1$ having equal polarities with those of the diodes $13_1$ and $14_1$. A high-frequency blocking coil 18 having a neutral point which is grounded is interposed between the short-circuited portions as described. Another high-frequency blocking coil 19 having a neutral point connected with a terminal 20 is provided such that the two ends of the coil 19 are connected through diodes 21, 22, 23, and 24 with the two ends of the coil 18 at polarities as shown in FIG. 3. One end of the latter high-frequency blocking coil 19 is connected through a coaxial cable 9 of an impedance equal to the characteristic impedance of the coaxial cables 6 to the receiver (not shown) of the direction finder; while the other end of the coil 19 is grounded through a resistor 25 having a resistance equal to the characteristic impedance. The terminals 20 and 15 receive control voltages of rectangular waveforms of, for example, several hundred Hz as shown at A in FIG. 4 and of a frequency twice higher than that as shown at B in FIG. 4; both being synchronized with each other through the cable 10 as shown in FIGS. 1 and 2.

With the above-described construction of the antenna device, when a positive control voltage is applied to the terminal 15, the diodes $13_0$, $16_0$ and $13_1$, $16_1$ connected between the terminal 15 and the grounded point of the coil 18 are made conductive, while the diodes $14_0$, $17_0$ and $14_1$, $17_1$ subjected to the reverse voltage are brought into an interrupting state. Conversely, when a negative control voltage is applied to the terminal 15, the former diodes conduct while the latter diodes interrupt.

In addition, when a positive control voltage is applied to the terminal 20, the diodes 21 and 24 connected between the terminal 20 and the grounded point of the coil 18 conduct; while the diodes 22 and 23 being subjected to the reverse voltage are brought into interrupting state. When a negative control voltage is applied to the terminal 20, the above-described condition is reversed.

Figure 4:
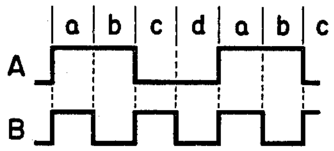
FIG. 4 is a waveform diagram showing waveforms of signals applicable to the circuit shown in FIG. 3.
Figure 5:
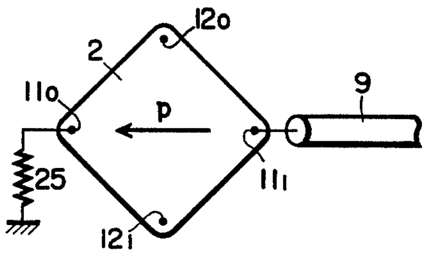
FIG. 5 is a diagram showing one operating state of the circuit shown in FIG. 3.

Accordingly, in a time period a shown in FIG. 4 at B, the diodes $13_0$, $16_0$, 21, $13_1$, $16_1$, and 24 are brought into conductive state while the rest of the diodes are interrupted, thus effectively presenting a circuit as shown in FIG. 5 for a high-frequency current. In this circuit, a maximum input can be obtained at the cable 9 when the electromagnetic wave arrives in a direction indicated by an arrow "p" (FIG. 5), while the input is reduced to zero for the electromagnetic wave arriving in the reverse direction. In other words, an antenna having a directional characteristic in the form of a cardioid as shown by solid line 26 in FIG. 6 can, thus, be obtained.

On the other hand, during the time period b in FIG. 4 at B, the diodes $14_0$, $17_0$, 21, $14_1$, $17_1$, and 24 conduct while the rest of the diodes interrupt, causing the connecting portion $12_0$ of the antenna plate 2 to be grounded through the resistor 25 while the connecting portion $12_1$ of the antenna plate 2 is connected to the cable 9. As a consequence, a directional characteristic in the form of a cardioid as shown by broken line 27 in FIG. 6 can be obtained.

Likewise, in the periods c and d of FIG. 4 at B, directional characteristics as shown by broken lines 28 and 29 are obtained by transferring operations of the electronic switch.

Figure 6:
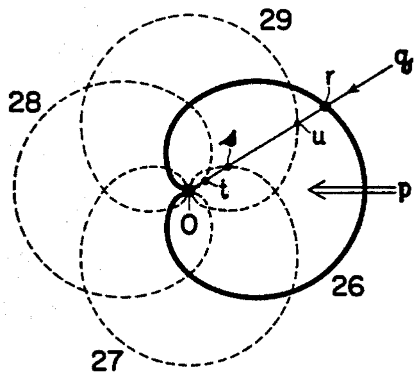
FIG. 6 is a diagram showing directivity characteristics of the antenna shown in FIG. 3.
Figure 7:
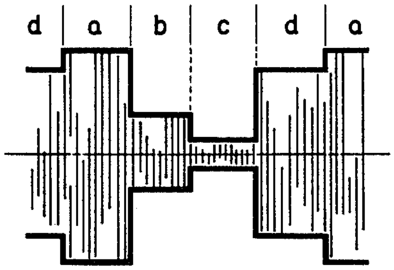
FIG. 7 is a diagram showing one example of the waveform of a signal obtained in the circuit of FIG. 3.

In a case where an electromagnetic wave arrives in a direction indicated by an arrow "q" in FIG. 6, inputs proportional to O-r, O-s, O-t, and O-u as shown in FIG. 6 are obtained during the periods a, b, c, and d. In the receiver receiving these inputs through the coaxial cable 9, for example, a signal having the same frequency as that of the rectangular wave shown in FIG. 4 at B is demodulated thereby to detect the phase angle of the same signal, or a signal as shown in FIG. 7 is demodulated to produce an output signal of a stepped waveform; and the arriving direction of the electromagnetic wave is detected from the phase angle of the signal or by observing the stepped waveform of the output signal.

Figure 8:
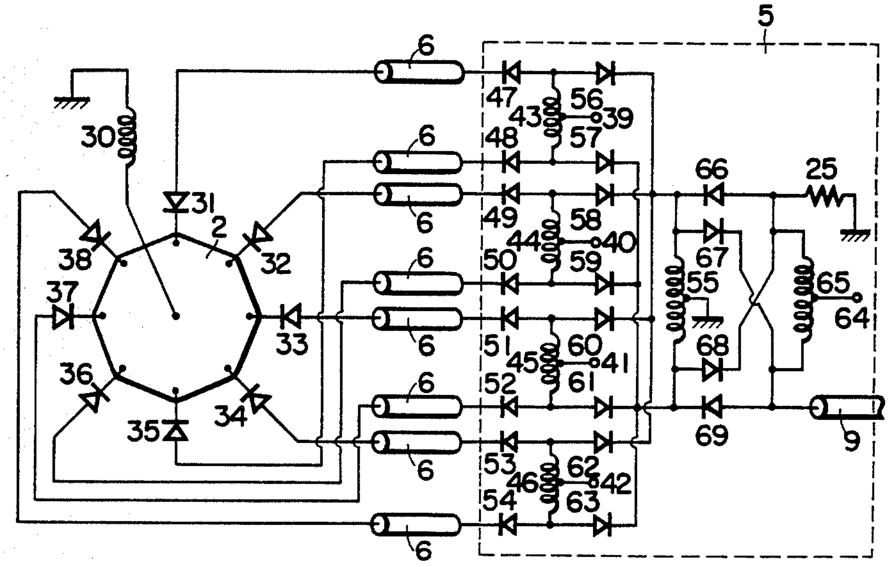
FIG. 8 is a circuit diagram applicable to still another embodiment of the present invention.

FIG. 8 illustrates still another embodiment of the present invention wherein an electrically conductive plate 2 of an equilateral octagonal configuration and effectively grounded through a high-frequency blocking coil 30 is used as the antenna. The angular portions of the octagonal antenna plate 2 are connected through diodes 31 through 38 of the same polarity to one end of the coaxial cables 6, the other ends of which are led into a casing 5 similar to that shown in FIGS. 1 and 2. Within the casing 5, the other ends of the coaxial cables 6 are connected with diodes 47 through 54 having polarities equal to those of the diodes 31 through 38. High-frequency blocking coils 43, 44, 45, and 46 having neutral points led out to terminals 39, 40, 41, and 42 are connected between the diodes 47 and 48, 49 and 50, 51 and 52, and 53 and 54, respectively, each of these pairs of diodes, for example, 47 and 48 being connected to the coaxial cables coming from diodes 31 and 35 provided at a pair of angular portions opposite to each other with respect to the central point of the octagonal antenna plate 2. Another high-frequency blocking coil 55 having an neutral point which is grounded is also provided in casing 5 so that the two ends of the coil 55 are connected to the two ends of the high-frequency blocking coils 43, 44, 45, and 46 through diodes 56 through 63, respectively, which are of the same but opposite polarity to that of the diodes 47 through 54. Still another high-frequency blocking coil 65 having a neutral point led out to a terminal 64 is further provided so that the two ends of the coil 65 are connected to the two ends of the high-frequency blocking coil 55 through diodes 66, 67, 68, and 69 connected as shown in FIG. 8.

Figure 9:
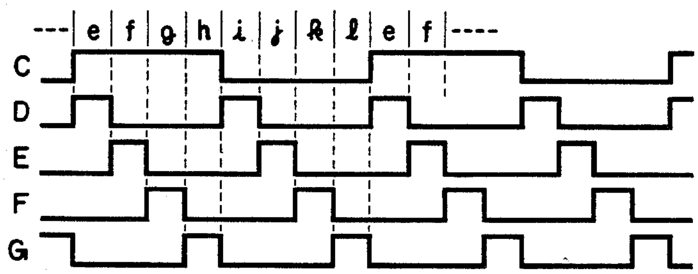
FIG. 9 is a waveform diagram showing waveforms of control voltages applied to various parts of the circuit shown in FIG. 8.

In operation, a control voltage of a low frequency AC as indicated in FIG. 9 at C is applied to the terminal 64, while pulse voltages indicated in FIG. 9 at D, E, F, and G are applied to the terminals 39, 40, 41, and 42, respectively. The pulse voltages include positive pulses rising up from a negative voltage sequentially, each positive pulse having a pulse width corresponding to ⅛ cycle of the AC control voltage as shown in FIG. 9 at C. Thus, for example, in a period e in FIG. 9, the diodes 66, 69, 47, 48, 56, 57, 31, and 35 conduct while all of the remaining diodes are interrupted. Thus, the connecting portion of the antenna plate 2, connected with the diode 31, is grounded through the resistor 25; and the connecting portion opposite to this portion with respect to the central point of the antenna plate 2, connected with the diode 35, is connected to the coaxial cable 9. In the subsequent periods f of FIG. 9, the diodes 66, 69, 49, 50, 58, 59, 32, and 36 conduct; and, therefore, the connecting portions connected with the diodes 32 and 36 are connected to the resistor 25 and the cable 9, respectively. In this manner the connecting portions of the antenna plate 2 to be connected to the resistor 25 and the cable 9 are successively transferred by the electronic switch in the casing 5 so that the directional characteristic as indicated by the solid line 26 in FIG. 6 is rotated by a step of 45°. Thus, the number of steps in FIG. 7 is increased more than the embodiment shown in FIG. 3, and the arriving direction of the electromagnetic wave can be determined more accurately with higher precision from the phase angle of the demodulated waveform or by observing the demodulated waveform which more closely approximates a sine wave.

Although the embodiments having antenna plates 2 of square and octagonal configurations have been described, the invention is not limited to these specific configurations; and the antenna plates of circular and hexagonal configuration may also be utilized.

In the case where the antenna plate 2 is of the square configuration, an octant error tends to occur depending on the relation between the length of the diagonal line and the frequency. By utilizing the antenna plate of the octagonal configuration, the octant error can be eliminated and an extremely small deca-hexant error is all that remains, thereby enabling directional measurement of high precision within a wide frequency range.

According to the present invention, there is provided an antenna device for a direction finder wherein the antenna is made of an electrically conductive plate disposed in parallel with a grounded base plate so that it exhibits a directional characteristic of a cardioid shape which can be rotated in a stepwise manner under the action of an electronic switch with a step of, for example, 90° or 45°. Since no mechanical rotating device, as in the conventional antenna device, is utilized for detecting the arriving direction of an electromagnetic wave, the construction of the antenna device can be substantially simplified, and the possibility of occurrence of trouble is substantially reduced.

As will be apparent to one skilled in the art, various modifications can be made within the scope of the aforesaid description. Such modifications being within the ability of one skilled in the art form a part of the present invention and are embraced by the appended claims.

It is claimed:

1. An antenna device for a direction finder comprising an electrically conductive base plate connected to a ground, an electrically conductive plate of a configuration symmetrical with respect to a central point thereof, which is disposed in parallel with the base plate with a predetermined space maintained between said base plate and said conductive plate, a plurality of pairs of connecting portions provided around the periphery of said electrically conductive plate so that one portion in each pair of the connecting portions is provided at a position opposite to the other portion in the pair with respect to the central point of said electrically conductive plate, and an electronic switch sequentially transferring the connection with the connecting portions such that one in each pair of the connecting portions thus transferred is grounded through a resistor having a resistance substantially equal to a characteristic impedance of said electrically conductive plate while the other in the pair is connected to a receiver through a cable having an impedance substantially equal to the characteristic impedance.

2. An antenna device as set forth in claim 1 wherein said electrically conductive plate is formed into a square so that two pairs of said connecting portions are provided around the periphery of said electrically conductive plate.

3. An antenna device as set forth in claim 1 wherein said electrically conductive plate is formed into an equilateral octagon so that four pairs of said connecting portions are provided around the periphery of said electrically conductive plate.

* * * * *